United States Patent
Lee et al.

(10) Patent No.: US 11,963,059 B2
(45) Date of Patent: Apr. 16, 2024

(54) NON-GEOSTATIONARY ORBIT (NGSO) AND GEOSTATIONARY ORBIT (GEO) HYBRID NETWORK FOR UNINTERRUPTED COMMUNICATIONS

(71) Applicant: Hughes Network Systems, LLC, Germantown, MD (US)

(72) Inventors: Lin-Nan Lee, Potomac, MD (US); Chi-Jiun Su, Rockville, MD (US); Victor Liau, Gaithersburg, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 92 days.

(21) Appl. No.: 17/542,292

(22) Filed: Dec. 3, 2021

(65) Prior Publication Data

US 2023/0180088 A1 Jun. 8, 2023

(51) Int. Cl.
*H04W 36/30* (2009.01)
*H04B 7/185* (2006.01)
*H04W 36/02* (2009.01)

(52) U.S. Cl.
CPC ........ *H04W 36/30* (2013.01); *H04B 7/18513* (2013.01); *H04W 36/023* (2013.01)

(58) Field of Classification Search
CPC ... H04W 36/30; H04W 36/32; H04W 36/023; H04W 36/026; H04B 7/18513; H04B 7/1858; H04B 7/1851; H04B 7/185
See application file for complete search history.

(56) References Cited

U.S. PATENT DOCUMENTS

| | | | |
|---|---|---|---|
| 6,678,520 B1 | 1/2004 | Wang | |
| 10,063,311 B2 | 8/2018 | Gopal | |
| 11,362,732 B2* | 6/2022 | Wendling | H04W 84/06 |
| 2008/0132240 A1* | 6/2008 | Baek | H04W 36/026 |
| | | | 455/442 |
| 2009/0219892 A1* | 9/2009 | Kim | H04W 36/32 |
| | | | 370/332 |
| 2015/0024677 A1 | 1/2015 | Gopal et al. | |
| 2016/0183145 A1 | 6/2016 | Chintada et al. | |
| 2017/0127323 A1* | 5/2017 | Peleg | H04B 7/18541 |
| 2020/0029265 A1 | 1/2020 | Choquette | |

OTHER PUBLICATIONS

International Search Report and Written Opinion dated Mar. 24, 2023 in corresponding PCT/US2022/051125.
Kodheli, "Satellite Communications in the New Space Era: A Survey and Future Challenges", arxiv.org, Cornell University Library, 201 Olin Library Cornell University Ithaca, NY 14853, Feb. 20, 2020, XP081604302.

* cited by examiner

*Primary Examiner* — Mohamed A Kamara
(74) *Attorney, Agent, or Firm* — NovoTechIP International PLLC

(57) ABSTRACT

A satellite communication system that combines the benefits of Geosynchronous Equatorial Orbit (GEO) and Non-geostationary (NGSO) satellite systems into a GEO-NGSO hybrid satellite system. The hybrid system allows for various uses, such as, a NGSO-GEO-NGSO handoff, a GEO-NGSO-GEO handoff, and/or a multi-transport operation utilizing both the GEO and NGSO satellites. Based on the path delay differences of the GEO and NGSO satellites, the system may create a data buffer to ensure no data loss.

20 Claims, 8 Drawing Sheets

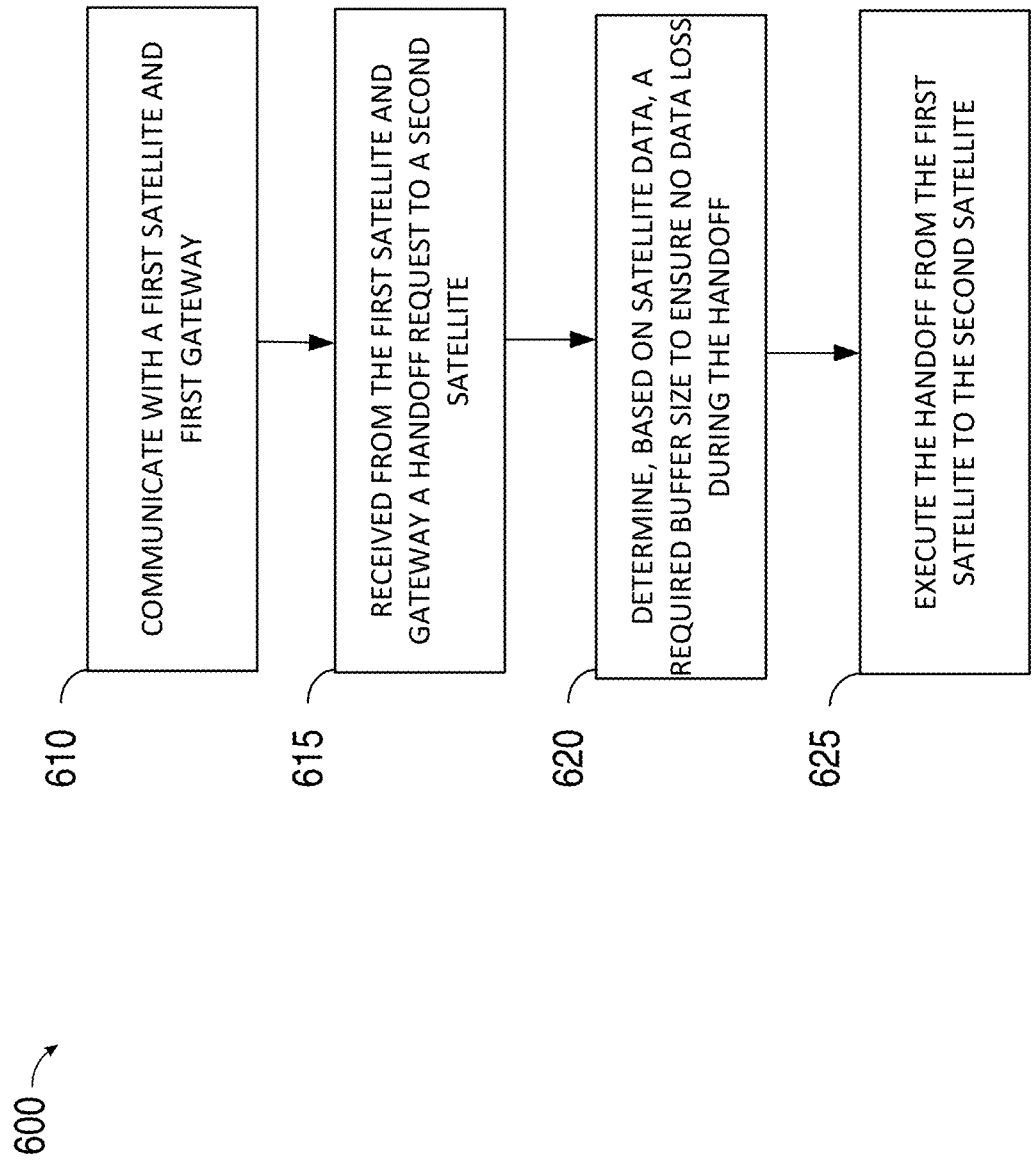

NON-GEOSTATIONARY ORBIT (NGSO) AND GEOSTATIONARY ORBIT (GEO) HYBRID NETWORK FOR UNINTERRUPTED COMMUNICATIONS

BACKGROUND

The need for high-speed broadband connections is universally important throughout the world. Many areas are not served or are underserved by fiber, cable, and/or other terrestrial systems for providing broadband coverage. Satellite systems can provide global high-speed coverage and may reach areas unserved or underserved. Thus, there is a significant need for new and improved mechanisms for providing satellite-based communication systems coverage.

The two primary types of satellites which provide satellite-based broadband communication are Non-geostationary Orbit (NGSO) and Geostationary Orbit (GEO). A Geostationary Orbit (GEO) satellite is approximately 35,786 km above the earth. There are various types of satellites that fall into the Non-geostationary orbit (NGSO), two of which are Medium Earth Orbit (MEO) and Low Earth Orbit (LEO). LEO satellites are typically found above the earth at 2000 km and below. Medium Earth Orbit (MEO) satellites are greater in altitude than that of the LEO and less than that of the GEO, around 2000 km to 35,786 km. As used herein, a constellation is a group of satellites at a given altitude.

Because typical NGSO handoffs are carried out with two antennas, one tracking the current satellite and another steered to the direction of the next satellite to be handed off to, it can become extremely difficult to build the antenna systems economically. Alternatively, two GEO style reflector-based antennas, are still more realizable and much more economical than one phase array antenna. Thus, disclosed herein are systems and methods relating to using one steerable LEO antenna and one fixed GEO antenna to facilitate a make before break connection.

SUMMARY

In summary, one aspect of the invention provides a system for uninterrupted communications in a hybrid satellite network, including: a multipath manager having a processor; and a memory that stores instructions that are executed by the processor to: communicate, from a server device, with a first gateway and a first satellite, wherein the first satellite is a non-geostationary (NGSO) type satellite or a geosynchronous equatorial orbit (GEO) type satellite; receive, from the first gateway, a handoff request, wherein the handoff request comprises information associated with a second satellite, wherein the second satellite is a NGSO type satellite or a GEO type satellite, and wherein the first satellite and second satellite are different types; buffer, based on the information associated with the second satellite, the communications with the first gateway and the first satellite; and execute the handoff from the first satellite to the second satellite.

Another aspect of the invention provides a customer premise equipment configured for uninterrupted communications in a hybrid satellite network, including: a multipath manager having a processor; and a memory that stores instructions that are executed by the processor to: communicate, from a client side device, with a first gateway and a first satellite, wherein the first satellite is a non-geostationary (NGSO) type satellite or a geosynchronous equatorial orbit (GEO) type satellite; receive, from the first gateway, a handoff request, wherein the handoff request comprises information associated with a second satellite, wherein the second satellite is a NGSO type satellite or a GEO type satellite, and wherein the first satellite and second satellite are different types; buffer, based on the information associated with the second satellite, the communications with the first gateway and the first satellite; and execute the handoff from the first satellite to the second satellite.

A further aspect of the invention provides a method for uninterrupted communications in a hybrid satellite network, including: communicating, from a client side device, with a first gateway and a first satellite, wherein the first satellite is a non-geostationary (NGSO) type satellite or a geosynchronous equatorial orbit (GEO) type satellite; receiving, from the first gateway, a handoff request, wherein the handoff request comprises information associated with a second satellite, wherein the second satellite is a NGSO type satellite or a GEO type satellite, and wherein the first satellite and second satellite are different types; buffering, based on the information associated with the second satellite, the communications with the first gateway and the first satellite; executing the handoff from the first satellite to the second satellite.

This Summary identifies example features and aspects and is not an exclusive or exhaustive description of the disclosed subject matter. Whether features or aspects are included in or omitted from this Summary is not intended as indicative of relative importance of such features. Additional features and aspects are described, and others will become apparent to persons skilled in the art upon reading the following detailed description and viewing the drawings that form a part thereof.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 6 shows an illustrative flow diagram of the system according to the instant disclosure.

DETAILED DESCRIPTION

Figure 1:
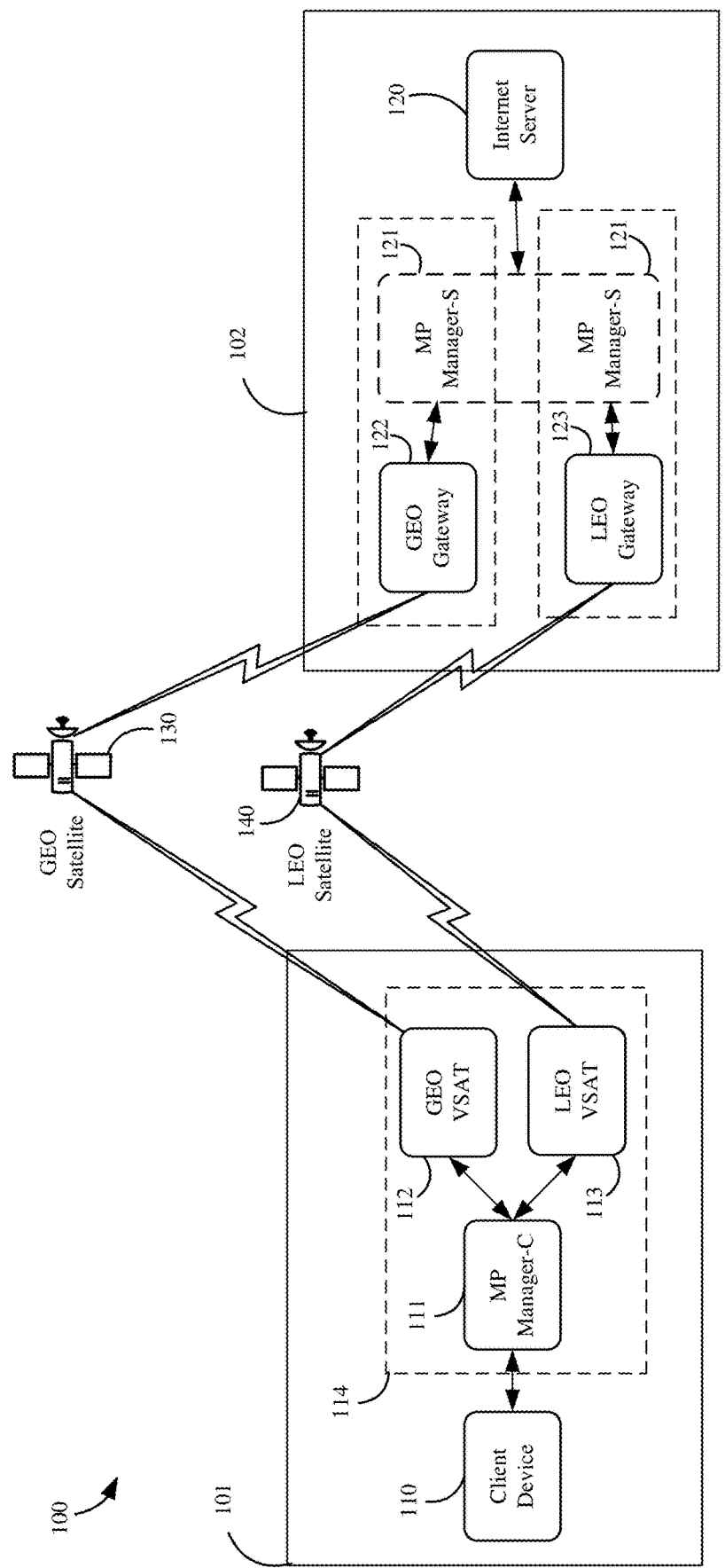
FIG. 1 show a diagram of an example implementation of the GEO-LEO hybrid system according to the instant disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The instant disclosure describes a technical solution to the problem of providing global coverage for satellite communication systems that combines the benefits of Geostationary Earth Orbit (GEO) and non-geostationary (NGSO) satellite systems into an integrated GEO-NGSO satellite communication system. Non-geostationary (NGSO) satellites occupy a range of orbital positions, for example, LEO satellites are located between 700 km-1,500 km from the Earth while MEO satellites are located at around 10,000 km from the Earth. It should be understood that the systems and methods described herein may be applied to any variation of NGSO satellite. However, solely for illustrative purposes, the various non-limiting examples herein will refer to a LEO satellite or LEO satellite equipment. The GEO-LEO communication system described herein includes an LEO constellation combined with a GEO constellation where the LEO constellation may provide global coverage with broad average capacity and may support 'hot spot' coverage where desired.

Non-Geo Synchronous Orbit (NGSO) satellites, especially LEOs, typically require frequent handoffs to maintain service continuity. Generally, LEO to LEO handoffs take place between satellites that are on the same orbital plane, or between satellites that are on adjacent orbital planes. Because a "make before break" connection is necessary, two antennas are required to complete handoffs without interrupting communications. In order to achieve the "make before break" connection, antenna beams need to transmit to and receive from two separate LEO satellites at the same time. Conventional systems utilize mechanical antennas, which require time in order to steer themselves towards a new direction. To further complicate the process, these handoffs may take place on feeder links (i.e., a radio link from an earth station at a given location to a satellite) and user links (i.e., a radio link from a satellite to an earth station at a given location) at different times.

Generally, LEO systems utilize the Ka- or Q/V-band because lower frequency spectrum bands is more difficult to acquire. Additionally, phase array antennas become more costly when they are capable of operating at the Ka- or Q/V-band. Thus, due to the delay caused by the mechanical antenna system, the difficulty acquiring proper frequency bands, the increased cost, and the potential for a loss service, disclosed herein are systems and methods to use a GEO satellite antenna as a temporary or back-up connection to handle traffic during the handoff. Furthermore, mechanically steered antennas, like those used in a LEO are more expensive than fixed mounted GEO antennas and require more maintenance. GEO antennas are only required to point to a fixed direction toward the GEO satellites arc, making it quicker and simpler to implement. Accordingly, the instant disclosure proposes to use a GEO satellite antenna as an intermediate step, or fill-in, to ensure continued communication during a LEO satellite handoff (i.e., while the LEO satellite antenna is being steered to a new direction).

Moreover, terrestrial based user gateways typically execute handoffs with only one transceiver (i.e., hopping back and forth between two serving base stations for traffic and signaling) because standard-based handoff protocols do not allow transmission of traffic and signaling at the same time, thus resulting in higher overhead. Direct application of terrestrial handoff protocols to large LEO satellite networks would likely cause a major fraction of useful service time per satellite because it would need to be used for signaling. Thus, separate transceivers (e.g., for signaling vs. traffic transmitting) which are operating at different frequencies and using separate antennas can avoid the problem. Thus, not only is the proposed solution less likely to fail, but it is also cheaper to implement.

In addition to the above, the disclosed system may provide other useful benefits, such as, for example, providing support for critical GEO services. Specifically, a concept may be further extended to support critical GEO service (e.g., for severe rain fade or other outages caused by interference), as it is usually possible to find a LEO satellite with less severe pathloss due to rain fade or interference as a backup. More specifically, the LEO satellites may provide coverage during severe rain fade or other outages caused by interference, because it is usually possible to find a LEO satellite with less severe pathloss due to rain fade or interference. A further solution may also utilize both paths simultaneously to minimize latency, maximize throughput, or support other routing policy.

The systems and methods disclosed herein generally relate to three specific use cases. The first is a use a GEO or LEO satellite as a transitional intermediary. Most of these use cases involve a LEO-GEO-LEO handoff, in which a LEO Very Small Aperture Terminal (VSAT) signals to LEO Gateway (GW) that it is time to perform a handoff. However, it should be understood that the transition may be carried out in a GEO-LEO-GEO handoff. In first use case (i.e., LEO-GEO-LEO) the GEO may be utilized as an intermediary to allow for a smooth uninterrupted transition. Stated differently, the GEO is used as a bridging connection during LEO connection changeovers when: only one LEO antenna is available, using a short time scale, there is a "hole" in the LEO constellation, using a long-time scale, the whole LEO constellation has not been built yet, and/or at least one LEO satellite stops operating and has not been replaced. Once the system verifies that the GEO Link is working, the LEO GW starts the handoff. Once the LEO antenna has locked on to the next LEO satellite, the GEO VSAT then signals to GEO GW that the next LEO satellite is ready to receive the handoff.

The second is using the system as a diversity backup. For example, a GEO satellite can operate as a backup for any LEO communication in case of any issues or a disconnection of the LEO communication system. This allows the system to reduce any interference (e.g., due to weather or sun outage) that may be present in one of the communication methods (e.g., a LEO or GEO connection). In this implementation, the handoff starts immediately as the GEO path is experiencing connection issues. Once the GEO path has recovered, the LEO VSAT then signals the LEO GW to initiate disconnection from the LEO satellite.

The third, and final use case, involves utilizing both the LEO and the GEO satellite to create a multi-transport operation. In this system, both satellites are connected and utilized in tandem. The traffic may be routed based on optimization factors, such as, for example, optimizing the cost, the latency, the bandwidth efficiency, and the like. Additionally, the system may route traffic based on the needs of the traffic (e.g., sending latency sensitive data over low latency link (LEO) and sending latency tolerant data over high latency link (GEO). In a further embodiment, both transport channels (i.e., the LEO and GEO) operate as a single connection passing all data equally across the connections.

Referring now to FIG. 1, an illustrative example of GEO/LEO hybrid network 100 is shown. In some embodiments, and as shown, the GEO/LEO hybrid network may include client side 101 and a server side 102. In some implementations, the client side 101 may include: a client device 110 and customer premise equipment 114. The customer premise equipment 114 may include a client Multipath (MP) Manager 111, a client GEO VSAT 112, and a client LEO VSAT 113. The dashed area around the customer premise equipment 114 is shown to indicate that generally, on the client side, the MP manager and satellite gateways are collocated (i.e., stored at the same physical location). However, it should be understood that the physical location of the components may vary based on system requirements, for example, the MP-Manager-C 111, the GEO VSAT 112, and the LEO VSAT 113 may be separately distributed across the client's facility.

The server side 102 may include: an internet server 120, a server MP manager 121, a server GEO gateway 122, and a server LEO gateway 123. When a user, or client, attempts to access the internet server 120, the client device 110 passes the request to the customer premise equipment 114. The customer premise equipment 114 via the MP manager 111 provides a switching/interfacing ability between the GEO VSAT 112 and the LEO VSAT 113 and includes additional storage to compensate for any propagation delay (e.g., caused by traffic sequencing and routing, see FIG. 5A and FIG. 5B). In some embodiments, the client-side equipment includes two completely separate reflector-based antennas (not shown). The first being a fixed mount GEO antenna, associated with, or housed within, the GEO VSAT 112, and is pointed properly to the serving GEO satellite at the time of installation. The second being a LEO antenna, associated with, or housed within, the LEO VSAT 113 with 2-axis tracking capability and its own RF head.

Figure 2:
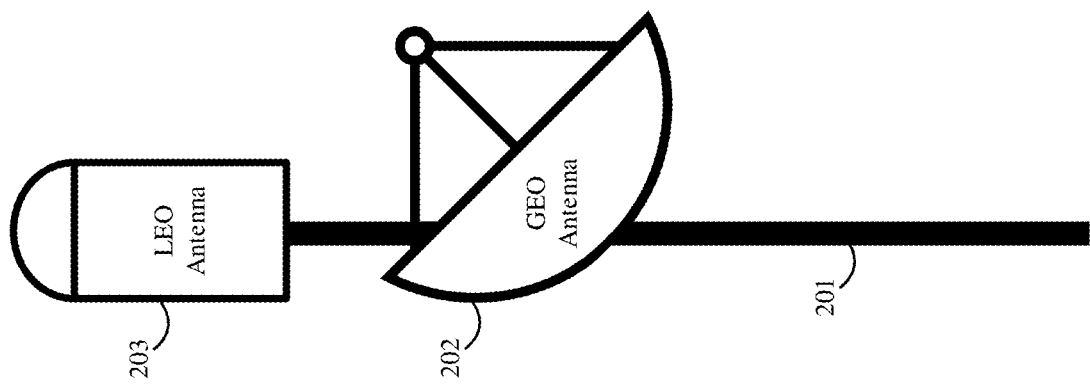
FIG. 2 shows a diagram of a single LEO-GEO installation according to the instant disclosure.

Referring briefly to FIG. 2, in some embodiments, it may be possible to use a single antenna base 201 with a fixed pole at the lower portion for mounting the GEO antenna 202, while also having a motorized upper section for mounting the LEO antenna 203, which would still allow for proper azimuth and elevation pointing. In an alternative embodiment, and to accommodate for different air-interface specifications for LEO and GEO antenna/gateways may be separate units, which may be collocated or located at different sites.

Referring again to FIG. 1, once the request to access the internet server 120 has been routed through the MP manager 111 and to the desired gateway (e.g., the LEO VSAT 113, GEO VSAT 112, or both) the respective satellite (e.g., the LEO satellite 140, GEO satellite 130, or both) passes the request to the server-side gateway (e.g., LEO gateway 123, GEO gateway 122, or both). The server-side gateway then passes the request to the server-side MP Manager 121. Similar to the client side, the gateways 122/123 and MP manager 121 may all be collocated. Additionally, or alternatively, the MP manager 121 may be collocated with only the GEO gateway 122 or only the LEO gateway 123. Thus, the server-side MP manager 121 is shown as dashed to indicate it may be at either location or reside in the cloud.

Generally, gateways for GEO systems and LEO systems are not collocated, thus the embodiments described herein may compensate for any additional latency will be added do the transmission times between the GEO and LEO systems. During the LEO-GEO-LEO handoff, the LEO gateway may serve as anchor. However, for GEO-LEO-GEO handoff, the GEO gateways should server as the anchor, and the MP Manager may be located at GEO gateway. Alternatively, in a multi-transport system (i.e., when using both the LEO and the GEO systems) that uses both paths, a central data processing center or "Fusion Center" (i.e., the MP-Manager-C 111, the MP-Manager-S 121, etc.) may be utilized. For TCP/IP based traffic, GEO may continue to use a Performance Enhancing Proxy (PEP), which may reside in the either the Client or Server MP manager. For multi-transport operation with both paths one or more of the following may be used: TCP/IP based traffic may be supported by Multipath TCP with IP packets, QUIC traffic routing using a flow-based process, and/or carrier aggregation (i.e., 3GPP/LTE).

Figure 3:
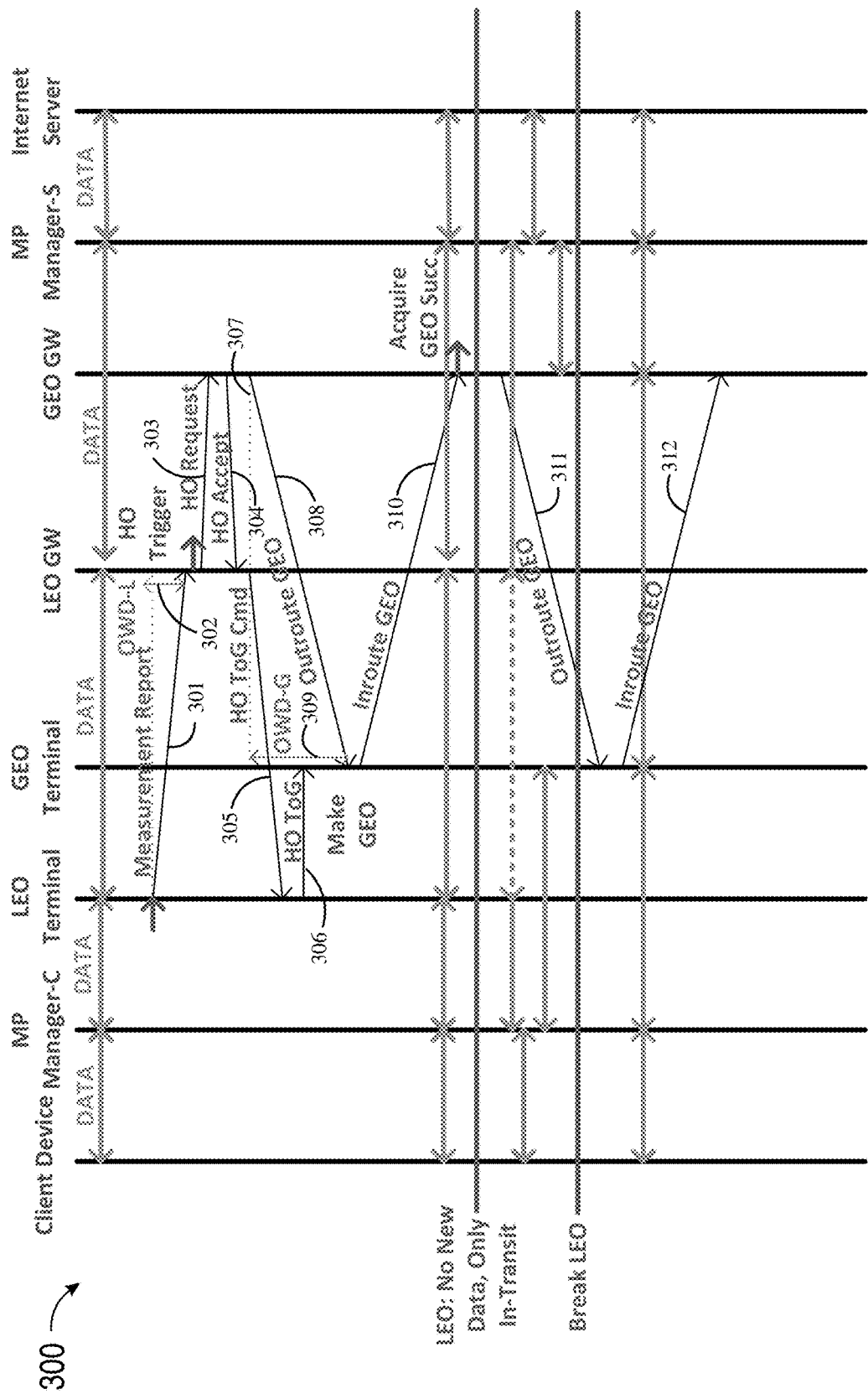
FIG. 3 shows an illustrative diagram of a LEO to GEO handover according to the instant disclosure.

Referring to FIG. 3, an illustrative example 300 of a LEO to GEO handover is shown, with the GEO carrying no relevant traffic initially. Initially, a measurement report is sent from the LEO terminal to the LEO gateway 301. As would be expected, the transmission of the measurement report takes time to pass from a client terminal, through the LEO satellite, and down to the LEO gateway, this is referred to as the OWD-L (one-way-delay for LEO) and is shown at 302. Once the LEO gateway receives the measurement report and the measurement report is below a desired threshold level, a handoff (HO) is triggered and a handoff request 303 is sent to the GEO gateway. The GEO gateway in response identifies a potential GEO satellite for handoff. Once the GEO gateway processes the request and identifies a potential GEO satellite for the handoff, an accept message 304 is sent back to the LEO gateway. The LEO gateway then sends a handoff to GEO command 305 to the LEO terminal. The LEO terminal then notifies the GEO terminal that a handoff is incoming 306

Once the GEO terminal has been notified of the handoff 306, the GEO gateway acquires a GEO out route (i.e., forward link) 307. Once the GEO terminal has connected to the desired GEO satellite it receives an outroute signal from the GEO gateway 308, via the GEO satellite. Similar to the measurement report transmission in Step 301, the GEO gateway to GEO terminal transmission requires time to pass through the GEO satellite, this OWD-G is shown at 309. In some embodiments, and as shown, the OWD-L is smaller than the OWD-G, thus the one-way delay is greater for GEO satellites than LEO satellites. The GEO terminal then sends an inroute signal to the GEO gateway 310 via a GEO satellite. Once the inroute signal is received, indicating that the GEO connection has be made, no new data will flow via the LEO Terminal/GW, thus completing the "make before break" connection. Any data remaining in the LEO system will drain down as the transmission completes and the LEO connection is then terminated. Additional subsequent data flow may take place between the GEO terminal and the GEO gateway as shown at 311 and 312.

Figure 4:
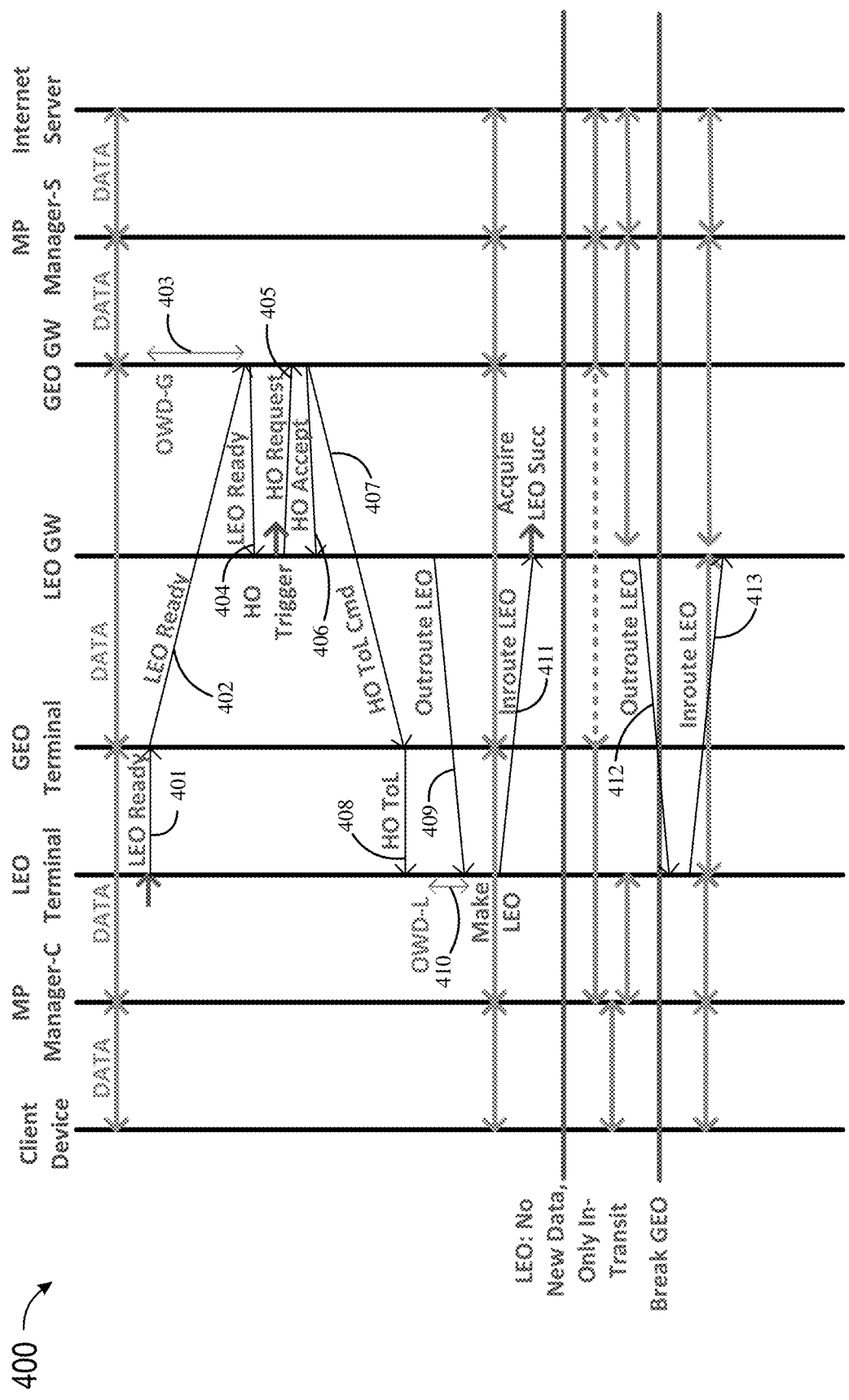
FIG. 4 shows an illustrative diagram of a GEO to LEO handover according to the instant disclosure.

Referring to FIG. 4, an illustrative example 400 of a GEO to LEO handover is shown. Initially, the LEO terminal notifies the GEO terminal that a LEO satellite is available and ready to transmit 401. Because the LEO terminal has no access to the gateways, the GEO terminal passes the LEO ready message 402 to the GEO gateway, via the GEO satellite. As with the prior example, the transmission of LEO ready signal takes time to pass from a client terminal (e.g., the GEO terminal), through the GEO satellite, and down to the GEO gateway, which is shown as the OWD 403. The GEO gateway then passes the LEO ready signal off to the LEO gateway 404, which triggers a handoff request. LEO gateway then sends a handoff request 405 to the GEO gateway. Once processed, the GEO gateway send a handoff acceptance message back to the LEO gateway 406. At approximately the same time, the GEO gateway sends a handoff to LEO command to the GEO terminal 407. The GEO terminal then notifies the LEO terminal that a handoff is imminent 408.

Once the LEO gateway has connected to the desired LEO satellite it sends an outroute signal to the LEO terminal 409, via the LEO satellite. Similar to the measurement report and the GEO outroute, the LEO gateway to LEO terminal transmission requires time to pass through the LEO satellite, this one-way-delay (OWD-L) is shown at 410 The LEO terminal then sends an inroute signal to the LEO gateway 411 via a LEO satellite. Once the inroute signal is received, indicating that the LEO connection has be made, no new data will flow via the GEO Terminal/GW, thus completing the "make before break" connection. Any data remaining in the GEO system will drain down as the transmission completes and the GEO connection is then terminated. Additional subsequent data flow may take place between the GEO terminal and the GEO gateway as shown at 412 and 413.

In addition to the illustrative examples of FIGS. 3 and 4, additional handover scenarios may exist. For example, in an alternative GEO-LEO-GEO handoff, in which the handoff starts immediately due to the GEO path experiencing connection issues. In this embodiment, a GEO VSAT signals to a GEO GW via a LEO VSAT that its GEO path is not functioning properly. Thus, the LEO operates as a backup or redundancy while the GEO connection is reestablished. Once the GEO path has recovered, the LEO VSAT then signals the LEO GW to initiate disconnection from the LEO satellite.

In another embodiment, the system may utilize both the LEO and the GEO satellites to create a multi-transport operation. In this system, both satellites are connected and utilized in tandem. The traffic may be routed based on optimization factors, such as, for example, optimizing the cost, the latency, the bandwidth efficiency, and the like.

Figure 5A:
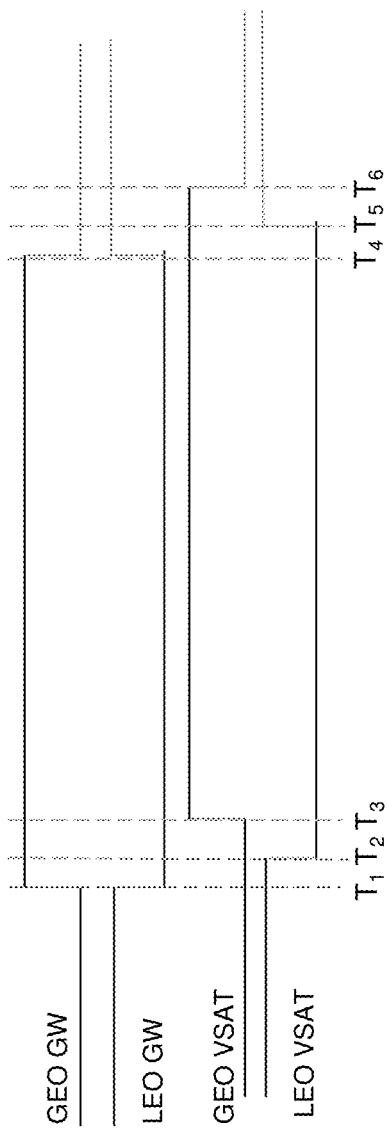
FIG. 5A and FIG. 5B show an illustrative timing diagram according to the instant disclosure.
Figure 5B:
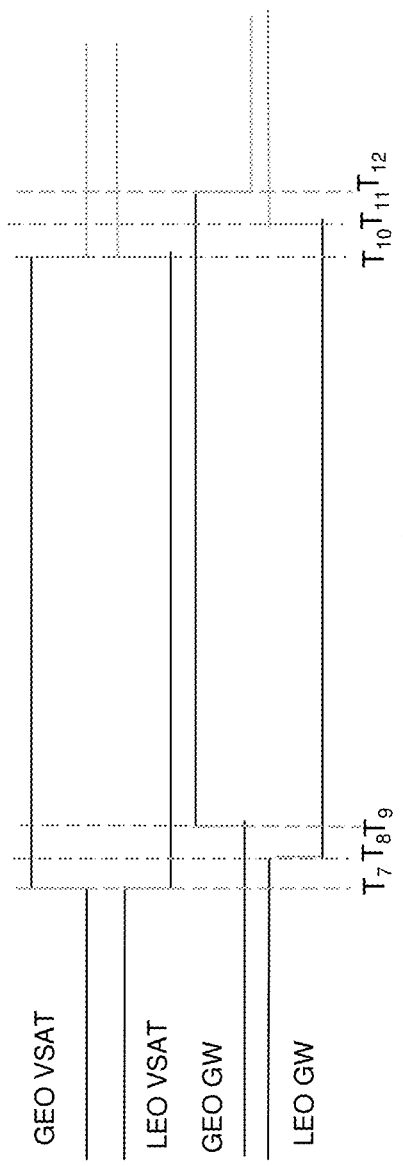

Referring now to FIGS. 5A and 5B, an illustrative example of the timing for a LEO-GEO-LEO handoff is shown. As shown, FIG. 5A represents an out-route handoff (i.e., a LEO to GEO transition), which begins at the LEO gateway at $T_1$. In some embodiments, the LEO gateway may determine that a handoff is required. This determination may be based on one or more various factors, such as, satellite position, satellite interference, availability of other satellites, and the like. Once the LEO gateway determines that a handoff should be executed, a signal is passed to the GEO gateway to request the handoff. Once the GEO gateway accepts the handoff request, the handoff process is performed, and the GEO satellite is utilized for connectivity while the LEO is released.

As should be understood by one of ordinary skill in the art, the transition from one satellite to another, especially between different types (i.e., LEO v. GEO) may result in a short connectivity outage or latency. Thus, the system may, in some embodiments, store pending communications (i.e., buffer) to ensure no data loss. In order to determine the size of the buffer, a path delay must be calculated. As shown in FIG. 5A, $T_1$ represents the start of the out-route handoff, which is why the LEO and GEO gateways are shown as "on" or triggered at the first dashed light associated with $T_1$. The dashed line associated with $T_2$ represents the time at which the LEO VSAT receives the handoff signal. Accordingly, the difference between $T_1$ and $T_2$ (i.e., $\Delta_1$) is the path delay for the LEO satellite. $T_3$ represents the time at which the GEO VSAT receives the handoff signal. Accordingly, the difference between $T_1$ and $T_3$ (i.e., $\Delta_2$) is the path delay for the GEO satellite.

Once these time delays are known, the system can properly account for them. For example, as shown in FIG. 5A, $T_4$ represents the completion of the out-route handoff, meaning that the GEO satellite has been acquired and transmission of data can resume. However, all previous traffic only had to account for the LEO path delay (i.e., $\Delta_1$) whereas the now that the GEO satellite is being used, the system must account for the longer path delay of the GEO satellite (i.e., $\Delta_2$). Stated differently, the LEO VSAT will need to buffer any data received between $T_5$ and $T_6$, because to the short break in connection that will exist due to the larger path delay of the GEO satellite.

Similarly, FIG. 5B represents an in-route handoff (i.e., a GEO to LEO transition), which begins when the LEO VSAT receives a handoff signal from the LEO gateway at $T_7$. As shown in FIG. 5B, $T_7$ represents the start of the in-route handoff, which is why the LEO and GEO VSATS are shown as "on" or triggered at the first dashed light associated with $T_7$. The dashed line associated with $T_8$ represents the time at which the LEO GW confirms it is ready for the handoff to begin. Accordingly, the difference between $T_7$ and T8 is the path delay for the LEO satellite, which is equal to $\Delta_1$. $T_9$ represents the time at which the GEO GW confirms it is ready for handoff to begin. Accordingly, the difference between $T_7$ and $T_9$ is the path delay for the GEO satellite, which is equal to $\Delta_2$. Stated differently, the LEO GW will need to buffer any data received between $T_{11}$ and $T_{12}$, because to the short break in connection that will exist due to the larger path delay of the GEO satellite.

Referring now to FIG. 6, an illustrative flow diagram 600 is shown according to the embodiments disclosed herein. In some embodiments, and as shown, the system may communicate with a first gateway and a first satellite 610. As discussed herein, depending on the type of use case (e.g., LEO-GEO-LEO handoff, GEO-LEO-GEO handoff, and/or multi-transport operation using both LEO and GEO), the first satellite may be either a LEO or GEO. The communication is then received by the second satellite (e.g., LEO or GEO depending on use case) 615. In some embodiments, the handoff request may comprise information associated with the first or second satellite, such as, for example, satellite position, satellite speed, satellite bandwidth, satellite path delays, and the like.

The system may then determine, based on the information associated with the first or second satellite, a required buffer size to ensure no data loss occurs during the handoff 620. The data is then stored (i.e., buffered) based on the difference in path delays between the first and second satellite, and the hand off is executed from the first satellite to the second satellite 625. In another embodiment, the system may maintain, via the first gateway, a connection to the first satellite and then communicate, from a client and/or device, with the first gateway, the first satellite, the second gateway, and the second satellite (i.e., a multi-transport system as disclosed herein). When the system is performing a GEO to LEO handoff, it may be possible for some of the data, or packets of data, to arrive out of order. This is because the LEO transmissions are faster than the GEO transmissions, so although a GEO transmission was sent out first, the later send LEO data may arrive before the GEO data. Thus, in some embodiments, data resequencing may be performed by the MP-Manager, or other component, to ensure no loss.

In a further embodiment, the system may detect communication interference between the first or second satellite. By way of non-limiting example, the system may detect one or more of the following: a natural phenomenon is creating interference, equipment failure interference, ground electromagnetic environment interferences, adjacent satellite interference, or any other man-made interference. The system may then, based on the detected interference, initiate a handoff request to reduce the interference. A further embodiment may simply pause or buffer any communications to/from a client/server device.

Additionally, or alternatively, the system may monitor the performance of the first and second satellite in order to determine a "preferred" satellite connection. Based on the determination, the system may utilize the preferred satellite connection and disconnect from the remaining satellite. In another embodiment, the system may maintain both connections (i.e., a multi-transport system) but only use the non-preferred connection as a backup or redundant connection in case of unexpected loss of connection to the preferred satellite.

The detailed examples of systems, devices, and techniques described in connection with FIGS. 1-6 are presented herein for illustration of the disclosure and its benefits. Such examples of use should not be construed to be limitations on the logical process embodiments of the disclosure, nor should variations of user interface methods from those described herein be considered outside the scope of the present disclosure. In some embodiments, various features described in FIGS. 1-6 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
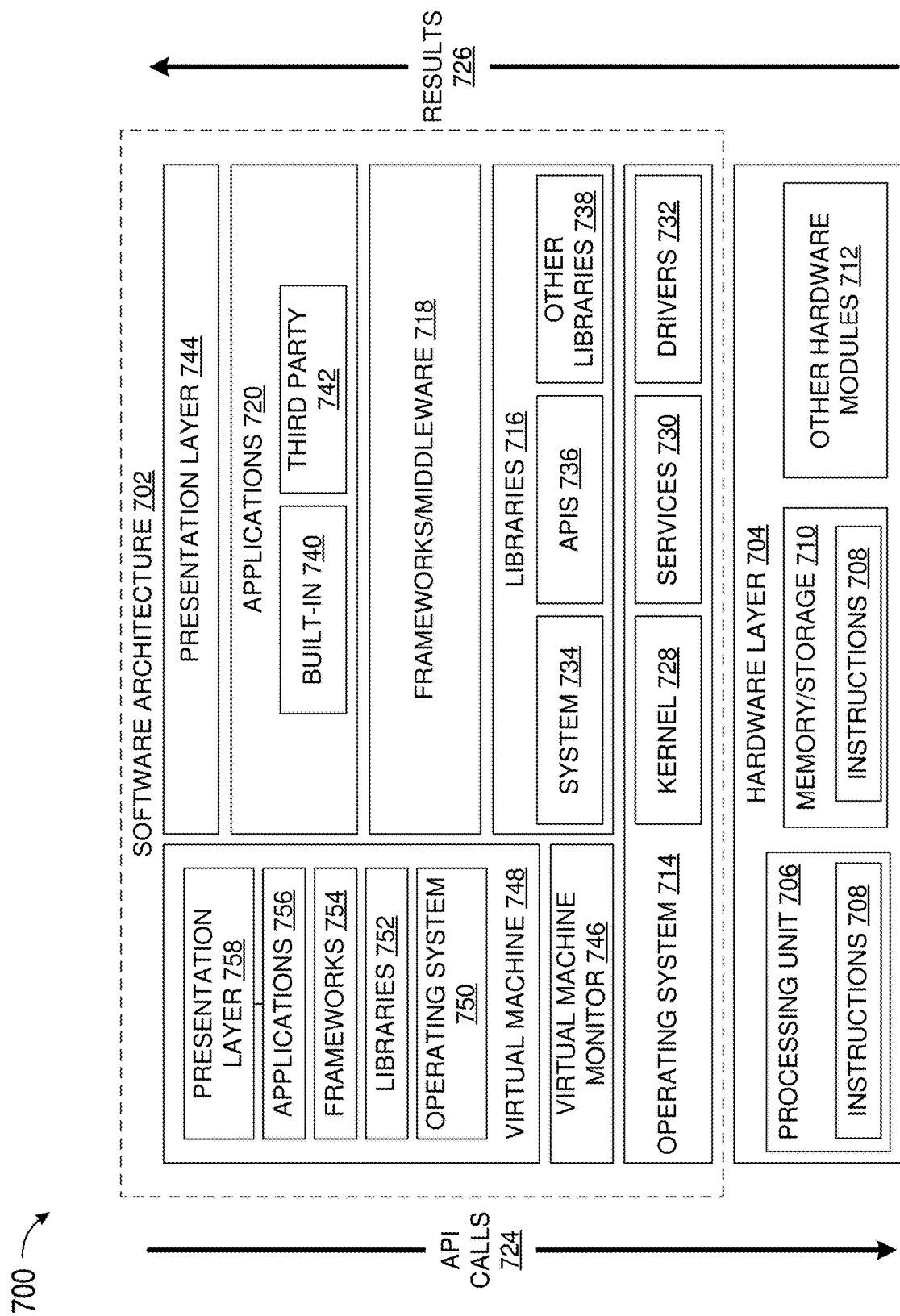
FIG. 7 is a block diagram showing an example software architecture, various portions of which may be used in conjunction with various hardware architectures herein described, which may implement any of the features described herein.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 708 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 600 of FIG. 6, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
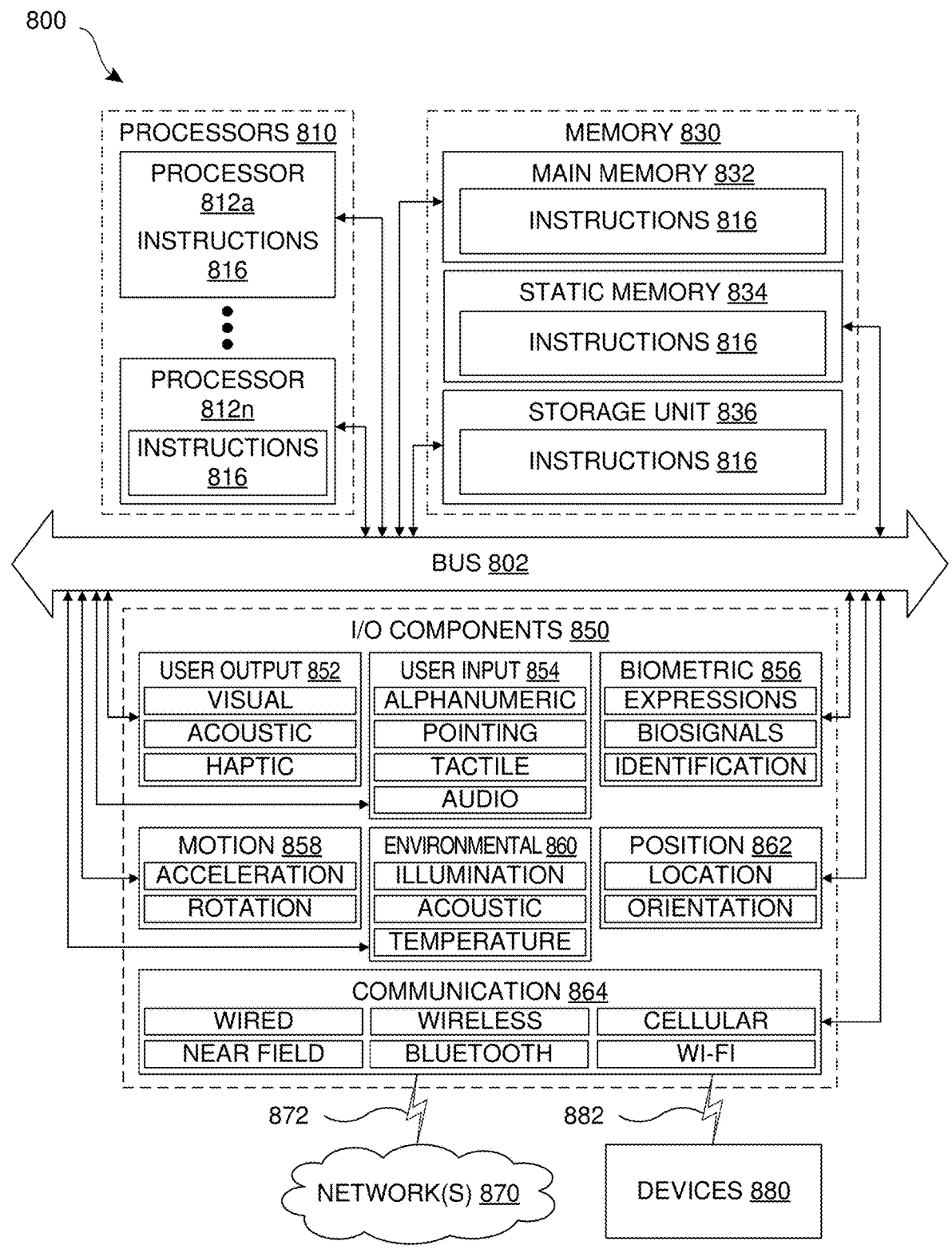
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for uninterrupted communications in a hybrid satellite network, comprising:
   a multipath manager having a processor;
   a memory that stores instructions that are executed by the processor to:
      communicate, from a server device, with a first gateway and a first satellite, wherein the first satellite is a non-geostationary (NGSO) type satellite or a geosynchronous equatorial orbit (GEO) type satellite, the first server device being associated with a hybrid satellite communication system that includes both NGSO and GEO type satellites, the first server device coordinating handoffs between NGSO type satellites and GEO type satellites of the hybrid satellite system;
      receive, from the first gateway, a handoff request, wherein the handoff request comprises information associated with a second satellite, wherein the second satellite is a NGSO type satellite or a GEO type satellite, and wherein the first satellite and second satellite are different types;
      buffer, based on the information associated with the second satellite, the communications with the first gateway and the first satellite; and
      execute the handoff from the first satellite to the second satellite.

2. The system of claim 1, wherein the memory further stores executable instruction, which when executed by the processor, cause the processor to detect a communication interference selected from the group consisting of: natural phenomenon interference, equipment failure interference, ground electromagnetic environment interferences, and adjacent satellite interference, and any other man-made interference, wherein the handoff request is triggered based on the communication interference.

3. The system of claim 1, wherein the memory further stores executable instruction, which when executed by the processor, cause the processor to:
   identify, one or more path delays between the first satellite and the second satellite; and
   determine, based on the one or more path delays, a data size for the buffering.

4. The system of claim 1, wherein the memory further stores executable instruction, which when executed by the processor, cause the processor to
   maintain, via the first gateway, a connection to the first satellite; and
   communicate, from the server device, with the first gateway, the first satellite, a second gateway, and the second satellite.

5. The system of claim 4, wherein the memory further stores executable instruction, which when executed by the processor, cause the processor to determine, based on the communication with the first gateway, the first satellite, a second gateway, and the second satellite, a preferred satellite.

6. The system of claim 4, wherein the memory further stores executable instruction, which when executed by the processor, cause the processor to
   identify a potential communication interference between the first satellite and the second satellite; and pause, based on the potential communication interference, the communication from the server device to the first gateway and the first satellite.

7. The system of claim 1, wherein the communication from the server device to the first satellite or second satellite is managed by a multipath manager.

8. The system of claim 1, wherein the first satellite utilizes a first frequency and the second satellite utilizes a second frequency, and wherein the first and second frequency are at least one of: the same or not the same.

9. The system of claim 1, wherein the first satellite is a NGSO type satellite and the second satellite is a GEO type satellite.

10. The system of claim 1, wherein the first satellite is a GEO type satellite and the second satellite is a NGSO type satellite.

11. A customer premise equipment configured for uninterrupted communications in a hybrid satellite network, comprising:
   a multipath manager having a processor, the multipath manager facilitating communications with a hybrid satellite communication system that includes both non-geostationary (NGSO) type satellites and geosynchronous equatorial orbit (GEO) type satellites, and wherein the hybrid satellite system facilitates handoffs between NGSO type satellites and GEO type satellites of the hybrid satellite system;
   at least one fix-pointing antenna and at least one tracking antenna; and
   a memory that stores instructions that are executed by the processor to:
      communicate, from a client-side device, with a first terminal and a first satellite, wherein the first satellite is a non-geostationary (NGSO) type satellite or a geosynchronous equatorial orbit (GEO) type satellite;
      receive, from the first terminal, a handoff request, wherein the handoff request comprises information associated with a second satellite, wherein the second satellite is a NGSO type satellite or a GEO type satellite, and wherein the first satellite and second satellite are different types;
      buffer, based on the information associated with the second satellite, the communications with the first terminal and the first satellite; and
      execute the handoff from the first satellite to the second satellite.

12. The system of claim 11, wherein the instructions that are further executed by the processor to detect a communication interference selected from the group consisting of:
   natural phenomenon interference, equipment failure interference, ground electromagnetic environment interferences, and adjacent satellite interference, and any other man-made interference, wherein the handoff request is triggered based on the communication interference.

13. The system of claim 11, wherein the instructions that are further executed by the processor to:
   identify, one or more path delays between the first satellite and the second satellite; and
   determine, based on the one or more path delays, a data size for the buffering.

14. The system of claim 11, wherein executing the handoff from the first satellite to the second satellite further comprises:
   maintaining, via the first terminal, a connection to the first satellite; and
   communicating, from the client side-device, with the first terminal, the first satellite, a second terminal, and the second satellite.

15. The system of claim 14, wherein the instructions that are further executed by the processor to determine, based on the communication with the first terminal, the first satellite, a second terminal, and the second satellite, a preferred satellite.

16. The system of claim 14, wherein the instructions that are further executed by the processor to identify a potential communication interference between the first satellite and the second satellite; and
   pause, based on the potential communication interference, the communication from the client-side device to the first terminal and the first satellite.

17. The system of claim 1, wherein the first satellite utilizes a first frequency and the second satellite utilizes a second frequency, and wherein the first and second frequency are at least one of: the same or not the same.

18. The system of claim 11, wherein the first satellite is a NGSO type satellite and the second satellite is a GEO type satellite.

19. The system of claim 11, wherein the first satellite is a GEO type satellite and the second satellite is a NGSO type satellite.

20. A method for uninterrupted communications in a hybrid satellite network, comprising:
   communicating, from a client-side device, with a first terminal and a first satellite, wherein the first satellite is a non-geostationary (NGSO) type satellite or a geosynchronous equatorial orbit (GEO) type satellite;
   receiving, from the first terminal, a handoff request, wherein the handoff request comprises information associated with a second satellite, wherein the second satellite is a NGSO type satellite or a GEO type satellite, and wherein the first satellite and second satellite are different types, wherein the first satellite and the second satellite are associated with a hybrid satellite communication system that includes both NGSO type satellites and GEO type satellites, and wherein the hybrid satellite system facilitates handoffs between NGSO type satellites and GEO type satellites of the hybrid satellite system;
   buffering, based on the information associated with the second satellite, the communications with the first terminal and the first satellite;
   executing the handoff from the first satellite to the second satellite.

* * * * *